Patented May 1, 1928.

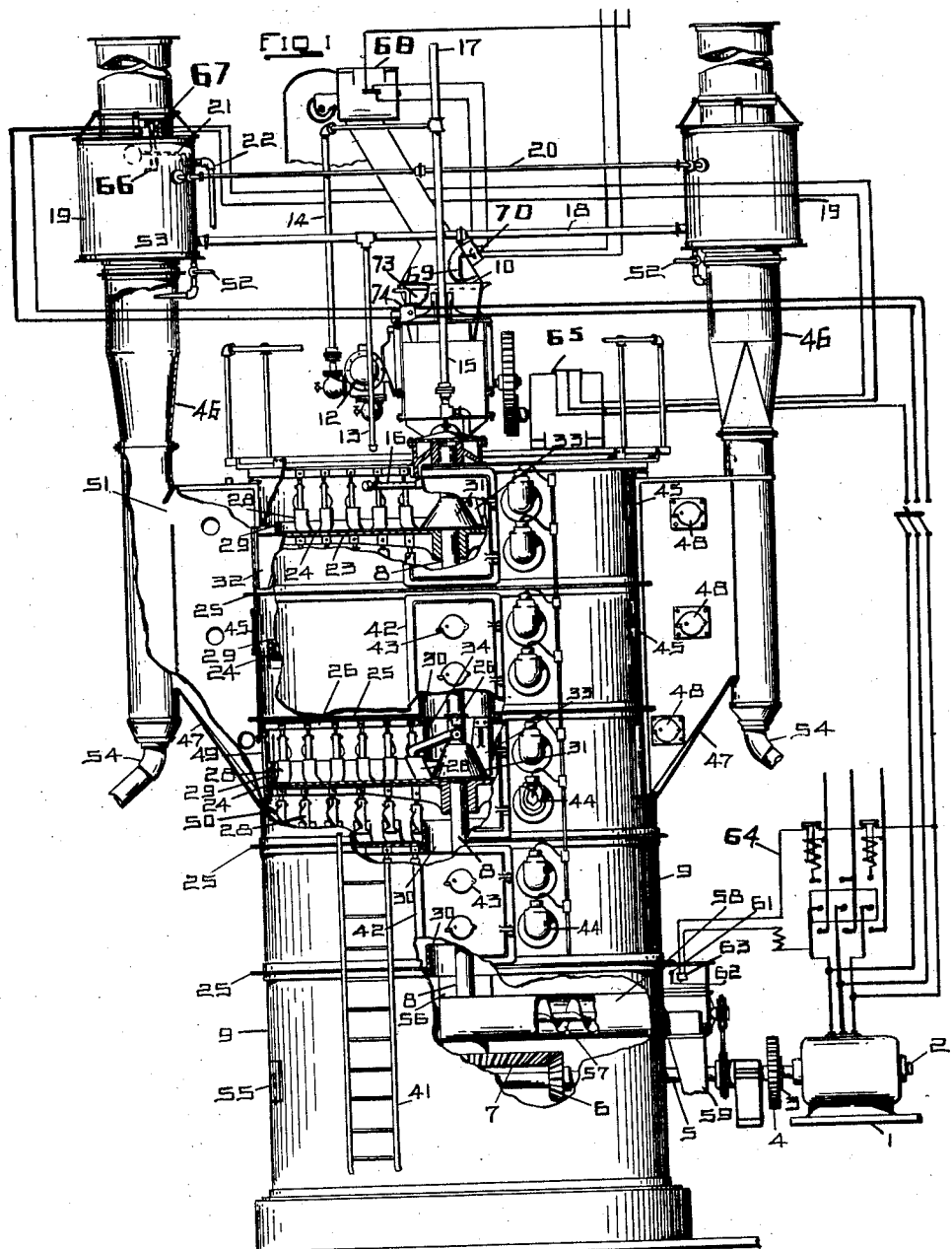

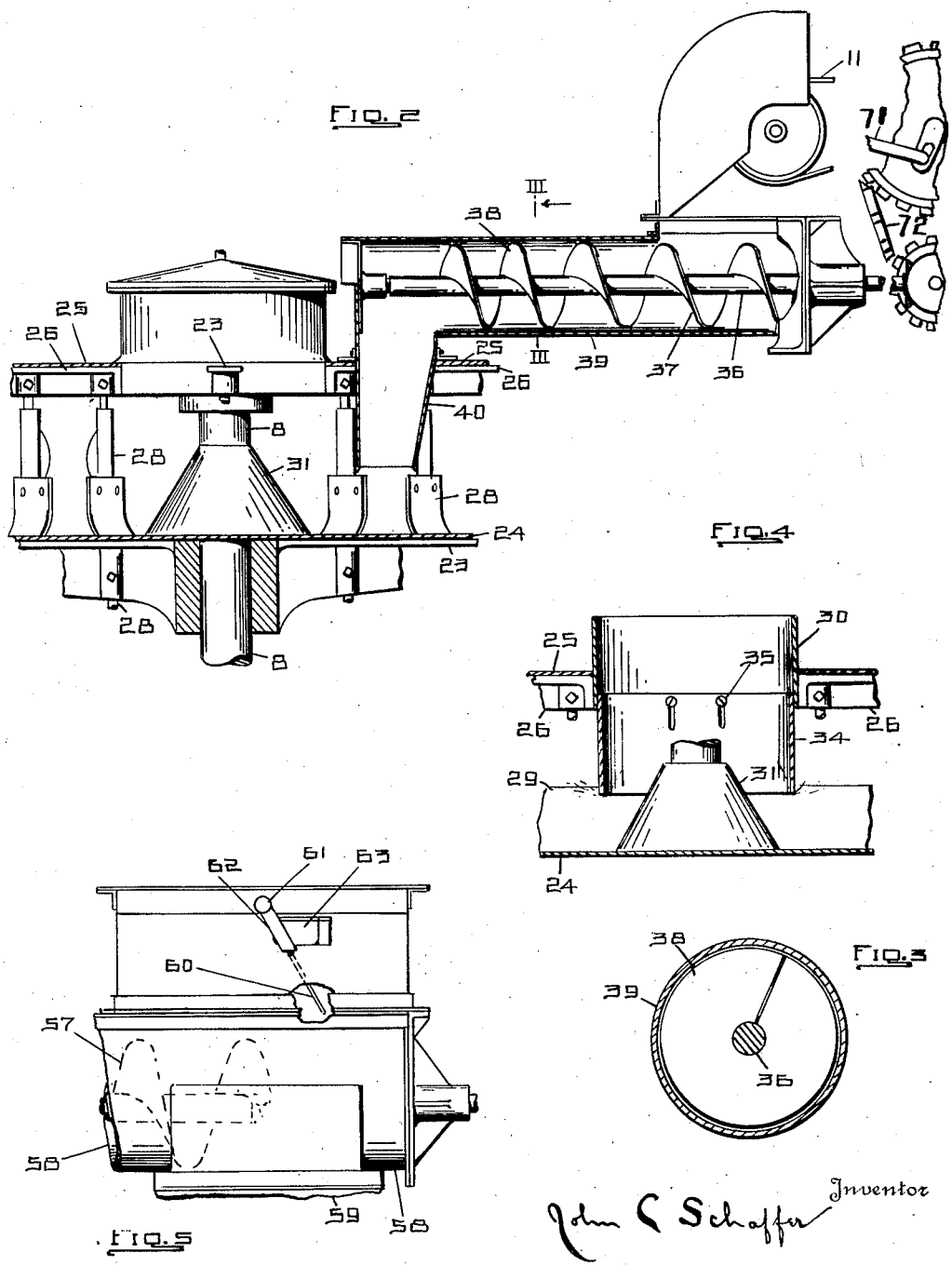

1,668,339

UNITED STATES PATENT OFFICE.

JOHN C. SCHAFFER, OF TIFFIN, OHIO, ASSIGNOR TO SCHAFFER POIDOMETER COMPANY, OF PITTSBURGH, PENNSYLVANIA, A CORPORATION OF PENNSYLVANIA.

METHOD AND APPARATUS FOR HYDRATION.

Application filed April 15, 1918. Serial No. 228,594.

This invention relates to the treatment of material, more especially the hydrating of oxids.

This invention has utility when adapted for continuous hydration of alkali earth oxids.

Referring to the drawings:—

Fig. 1 is a side elevation with parts broken away of an embodiment of the invention in an alkali earth oxid hydrator especially designed for the treating of calcined or burned limestone or dolomitic rock;

Fig. 2 is a fragmentary detail of the feeding device for the apparatus;

Fig. 3 is a section on the line III—III Fig. 2;

Fig. 4 is a detail in section of the adjustable controlling collar for establishing pressure chambers;

Fig. 5 is a detail of the discharge spout for the hydrator.

The motor 1 having the shaft 2 may serve, through the gearing 3, 4, to drive the shaft 5 having the pinion 6 in mesh with the gear 7 on the main shaft 8 vertically extending upward centrally of the hydrator housing 9. Hopper 10 is mounted on the top of this housing 9. This hopper 10 is operable for delivering material to the weighing belt or conveyor 11 (Fig. 2). The drive for this belt 11 operates in synchronism with the water supply mechanism 12 for taking water from the line 13 and delivering through the line 14, pipe 15 and spray 16 to the interior of the housing 9 of the hydrator. This pipe 15 has an upwardly extending open end 17 to serve as a vent in preventing any siphon flow between the apparatus 12 and the hydrator.

The supply line 13 is cross-connected by the line 18 to receive warm water supply from the stack jacketing tanks 19, the level being further balanced without disturbance of heat relation by the additional line 20. Water level is maintained in the tanks by the float valve 21 controlling the supply line 22.

Carried by the shaft 8 in the hydrator housing are radiating arms 23 carrying platforms 24, which platforms 24 alternate with fixed platforms 25 mounted on arms 26 carried by the housing 9. These arms 23, 26 carry plows 28 which may be variously deflected as shown for thoroughly agitating the material as well as ultimately progressing the material from the inner side of the platforms 24 over the peripheral lips 29 for falling upon the outer edge of the stationary platforms 25 where the next series of plows will urge the material to flow inward toward the center to pass over the inner collar 30 to fall upon the cone 31 centrally of the rotary platform 24. The rotary platforms 24 carry the scrapers 32 for clearing the inside of the housing 9 of any material accumulation. For clearing the cones 31 in a similar manner as the scrapers 32 clear the housing 9, there are provided the scrapers 33. These platforms 24, 25, provide a plurality of superposed chambers in the housing 9 coaxially disposed as to the housing 9 and shaft 8.

In the operation of this apparatus, in the exothermic reaction incident to the hydration of calcium oxid or magnesium oxid, considerable utility is found in isolating certain chambers or series of chambers from each other for maintenance of vapor pressure difference therebetween during the conducting of this continuous treatment. This is effected by the collar 34 projecting downward from a rigid platform 25 toward a movable platform 24. This collar or ring 34 may be adjustably mounted by the bolts 35 so that its extent or clearance as to the relatively movable platform may be adjusted as desired.

In the handling of quick limes or oxids from the limestone and dolomites in Northwestern Ohio, it has been found the submerging of the lower edge of this collar 34 an inch to an inch and a quarter in the material flowing thereunder may serve to create a steam or vapor pressure in the chamber or region above in excess of one ounce. In this practice, with a given adjustment for the plows 28, the flow of material across the platforms may conveniently have a range of four to six inches. But whatever depth is established, such depth can be maintained even with variation in hydrator output between five and fifteen tons per hour.

This establishment of a pressure in the upper chambers is maintained even during continuous feed in the operation of the hydrator, for the feed device shaft 36, Fig. 2, receiving the fragments of quick lime or other material from the belt 11 has its scroll 37 adjacent such receiving end of greater pitch than its scroll 38 adjacent the delivery end. This variation in scroll pitch is such that the supply to the scroll 37 may increase in depth at the scroll portion 38 in the housing 39 to come up to the shaft 36, thereby automatically vapor trapping the flow of the stock from this feed device into the chute 40 delivering into the hydrator.

In order that operating conditions may be readily inspected at all times, the housing 9 has the ladder 41 adjacent the man-hole doors 42, which man-hole doors are provided with peep openings 43 adjacent the interior illuminating lights 44, at each platform. In some operations, it may be desirable to break the pressure in the upper portion of the hydrator. This may be done by opening the gates 45. However, these gates 45 in the pressure portion are normally closed precluding communication of the series of chambers for the platforms above the collar 34 directly with the stacks 46.

Between the stacks 46 and the hydrator housing 9 are disposed the dust precipitating chambers 47 having draft providing adjustable peep-holes 48 which may be opened more or less to permit incoming air to chill the hot dust or particle carrying vapor passing from the housing 9 by way of the vent 49 into the chambers 47. This chilling of the hot gases has a marked tendency to precipitate the excess of entrained particles therefrom so that such particles return by the chute 50 to the hydrator 9. This precipitation chamber is effective to greater than 2% of the hydrator output in precipitating dust or fine particles of material treated. This dust precipitation is facilitated by the chamber 47 allowing expansion of the gases in their passage through the opening or vent 49, and this expansion chill is supplemented by the cold air supply chilling for further assisting in dust precipitation. These gases partially cooled may pass through the outlet opening 51 to the stacks 46 where the tanks 19 may chill the vapors for further precipitation of particles therefrom. However, in order that the stack discharge fumes may be approximately dust free, there is connection to the water tanks 19 having the valves 52 for controlling sprays 53 jetting into the stacks 46 effectively entraining particles of matter to pass off from the stacks 46 as a slurry in the ducts 54.

The quick lime and water supplied to the upper platforms is agitated and the heat given off establishes a steam envelope in a manner commercially found to materially increase the superiority of the product from the same limestone.

The collar 34 may be adjusted for holding the pressure desired with avoidance of blow thereunder. A little pressure as developed by the steam out of contact with water may be considered as having a little superheat. The material flow seems to include more or less of the vapor with its slight super-heat and this release tends to entrain the fine particles precipitated in the dual manner herein explained. This means a temperature drop in the material but the volume of the material is such that this temperature drop, although working to hold the material, may be effective during the continued treatment of agitation for effectively drying such material, as air is admitted through opening 55 in the housing 9 to pass up through lower collar 30 onto the lower platform and thus work as a draft in conjunction with the stacks 46. This lower platform of the hydrator has a discharge opening spout 56 to scroll conveyer 57 in housing 58 driven by the motor 1 actuating the hydrator.

This scroll conveyer 57 stops short of its delivery end from where the material may pass by the spout 59. In the event the material in the spout 59 is not taken away, it clogs the spout 59 and accumulating in the housing 58, by its congestion actuated from the scroll 57, moves the vane 60 as freely hanging in the housing 58. This movement of the vane 60 pivoted on the bar 61, carries arm 62 to operate push button 63 for opening the no voltage release line 64, thereby automatically stopping the motor 1 driving the hydrator, as well as motor 65 driving the hydration supply devices 11, 12. This accordingly serves as a cut-off for the hydrator and the feed of quick lime and water, in the event the material supplied by the hydrator is not taken by the mills or other apparatus in connection with which the installation is made and operated.

Interconnected automatic control may also extend to the deliveries of lime and water to the feed devices. Normally the float valve 21 provides water supply in the tank 19 at a constant level, but failure causes the float in further drop to pull arm 66, opening switch 67, to stop weighing machine motor 65 and thus preclude lime supply without water. When the hydrator stops, material accumulating in hopper 10 operates vane 69, to open switch 70, stopping motor 68 until motor 65 has cleared hopper 10.

The measuring device 12 is driven by connecting rod 71 from the material supply device actuated by motor 65, sprocket gearing 72 from the latter device operating the scroll shaft 36.

The device is one, accordingly, which insures automatically the continuous treatment of say calcium oxid in one stage for thorough hydration in a pressure maintained envelop and the cooling and drying of such hydrated lime, with provision made for effective separation of particles from the fumes.

The dust collection herein has reduced the stack waste from approximately 3% to less than .01% of the hydrator output.

The flanges 29 and 30 on the platforms 24, 25, in the operation of the machine not only have flow retarding action, but this retarding of the flow works out automatically in classifying the material undergoing treatment, especially when the material which is treated as a result of the reaction becomes more fluffy, as in the instance of calcium hydrate and magnesium hydrate. This fluffy material is worked to the surface by the plows 28 and more quickly passes over the flanges in its continuous progress through the apparatus. The particles less thoroughly hydrated are less fluffy and accordingly do not rise to the surface by agitation with as much readiness as the fully agitated fluffy particles. This means there is less rapid progress of the incompletely hydrated particles, which retarding of the unhydrated particles automatically operates to increase the time of treatment.

With the vapor envelope definitely under control as herein disclosed, there is effective steam penetration throughout the agitated mass on the floors or platforms. The water is added slightly in excess for insuring complete hydration, the excess to some extent passing out under the collar 34 entrained with the hydrated particles for immediate liberation, while other portions of the excess moisture adhere to this hydrated flowing hot material.

In this continuous treatment, the material is hot during the liberation of the excess moisture, and as it is agitated by the plows, there is no tendency to caking. The upward draft of cooling air assists in readily carrying away of this excess moisture which is conducted to by-pass the upper or pressure treatment chambers.

Vane 73 in hopper 10, upon supply of material in hopper 10 giving out, is free to swing for opening switch 74, thus stopping hydrator supply device motor 65 in the same manner as water shortage opens switch 67 to stop this same motor 65.

What is claimed and it is desired to secure by Letters Patent is:—

1. A multi-stage hydration apparatus including a vertically disposed cylindrical housing, horizontally disposed platforms therein providing a plurality of treating chambers for addition of moisture and agitation, a dust precipitating chamber laterally exterior of said housing in direct communication with an intermediate treating chamber of said housing, and a stack in direct communication with said precipitating chamber, whereby fumes from the upper terminal chamber must pass through said intermediate chamber and thence to the precipitating chamber for discharge by the stack.

2. A multi-stage hydration apparatus including material heating chambers for generating fumes from the material being hydrated, vent means for the passage of fumes from an intermediate heating chamber, a precipitating chamber connected to the intermediate chamber and with which the vent means communicates, and a controllable draft device for regulating chilling of the fumes to assist in precipitation thereof.

3. A hydration apparatus including a vertical cylindrical housing, horizontal platforms therein providing material heating chambers for generating fumes from the material being hydrated, a precipitating chamber laterally exterior of said housing and in direct communication with an intermediate treating chamber, a stack to which the precipitating chamber may directly deliver fumes, whereby fumes from the upper terminal chamber must pass to the intermediate chamber and thence to the precipitating chamber for discharge by the stack, and a jet for effecting supplemental precipitation in the stack.

4. A hydration treating apparatus including superposed alternate platforms movable relatively to intermediate platforms and forming material heating chambers for generating fumes from the material being hydrated, a stack for carrying off fumes from a chamber, and a water jacket for chilling the stack to thereby facilitate precipitation of particles from the fumes.

5. A multi-stage hydration apparatus including material treating chambers for generating fumes from the material being hydrated, a continuous scroll feed having a free fall discharge to one of said chambers, said feed provided with a housing extension forming with the feed self-packing means above said free fall discharge to preclude venting of the chamber through the feed, a vapor shut off material discharge from said chamber, and a moisture supply duct to said chamber whereby the moisture may be effective in association with the material in the generation of fumes for building up pressure in said chamber to be held back by said feed, said apparatus having an additional chamber freely vented for lower pressure to which lower pressure chamber the material from the other pressure chamber is delivered.

6. A hydration treatment apparatus including material heating chambers, continuous feeding means for a chamber embodying a multiple pitch scroll, a downspout between the scroll and chamber isolating material in the scroll from material in the chamber, a vapor shut off material discharge from said feed receiving chamber, and exothermic reaction promotion means embodying a moisture supply duct to said chamber whereby the moisture may be effective in association with the material to build up pressure in the chamber toward said downspout, said apparatus having an additional chamber freely vented for lower pressure to which lower pressure chamber the material from the other pressure chamber is delivered.

7. A multi-chamber hydration apparatus, continuous feeding means therefor embodying a scroll of shorter pitch at its delivery end, and an extension housing from the scroll having a downspout isolating material in the scroll from material in the chamber, said material in the scroll being packed at said extension housing by said shortening of the pitch thereof to preclude escape of fumes from the chamber through the downspout and scroll, a vapor shut off material discharge from said feed receiving chamber, and exothermic reaction promotion means embodying a moisture supply duct to said chamber whereby the moisture may react with the material in building up chamber pressure toward said downspout and scroll, said apparatus having an additional chamber freely vented for lower pressure to which lower pressure chamber the material from the other chamber is delivered.

8. A multi-stage apparatus including a material treating chamber, extension housing means providing a self-packing continuous discharge way from said chamber to preclude vent therefrom, a vapor shut off discharge from said chamber, and a moisture supply duct into said chamber whereby the moisture may build up vapor pressure in said chamber as held by said discharge way, said apparatus having an additional chamber freely vented for lower pressure to which lower pressure chamber the material from the other chamber is delivered.

9. A chemical reaction apparatus embodying a closed chamber having a horizontal floor, means rotatable relatively to and concentric with the floor of said chamber for receiving material flow from the chamber in providing a bed, and an annular collar projecting from the floor into said bed, means for supplying material to embed the free end of the collar for packing the discharge from the chamber to preclude vent from the chamber as the relative movement of the collar as to the means effects discharge out from all sides of the collar.

10. Multi-stage continuous treatment apparatus including a series of superposed chambers having horizontal floors providing material beds thereon, one floor movable relatively to the other, and projecting means carried by one of the floors extending therefrom into an adjacent bed, said floor being movable as to the material supported by said adjacent chamber floor, supply means for said material to embed said projecting means into the relatively traveling material on the latter floor for isolating one chamber from the other and spaced from said latter floor to provide annular discharge from the means to said latter floor.

11. A hydration apparatus including a housing, relatively rotatable coaxial platforms in said housing, means for progressing material over the platforms, and a collar carried by one platform and extending toward another platform below the material depth carried on said progressing platform to embed into said progressing material, thereby isolating one platform as a chamber in the housing from the other platform as a second chamber.

12. A multi-stage hydration apparatus, including relatively movable members, means providing a discharge way from the apparatus for material as actuated therefrom by the members, a vane in said way, a drive shaft through a plurality of stages of the apparatus for effecting relative movement between the apparatus members, and control means coacting with the vane for shutting off the drive upon congestion of material in the way to preclude clogging of material back into the apparatus.

13. A continuous flow treating hydrator having means providing a discharge way, a vane in said way, said hydrator embodying relatively movable material progressing members, a drive for the members, and control means operable by congesting of material in the way for acting upon the vane, said means including connections from the vane to the drive to stop the drive for maintaining the hydrator against material back-up thereinto for interference with continuous flow hydrator treatment.

14. A continuous flow treating hydrator embodying means providing a supply way, means providing a discharge way, relatively movable members for maintaining material flow for the ways, and automatic control means including way congestion operating mechanism provided with connections to the member to affect member movement for discontinuing material deliveries to said ways whereby said mechanism may be effective for maintaining the hydrator operation uniform for continuous flow treatment of material.

15. The hydration process of continuously subjecting material fragments to treatment, including the step of successively progressing the material in different stages in the same general direction by agitating the material, the additional step of separating two of said stages as independent vapor chambers with material flow therebetween isolating said stages for maintaining enveloping vapor pressure above that of the second stage and the step of supplying moisture into the first stage.

16. The hydration process of continuously mingling water and fragments of material for reaction therebetween including the step of treating in stages in the same general direction by agitating the material, and the additional step of establishing an enveloping vapor pressure difference between two stages by having continuous flow of material therebetween isolate the vapor of one stage with supply of moisture in such stage holding it at a pressure over the vapor of a succeeding stage.

17. The hydration process comprising the step of effecting exothermic reaction in stage treatment of material with agitation of the material, and during said reaction the step of establishing an enveloping vapor pressure difference between two stages during supply of material from one stage to the other by having said material choke communication between the stages, and the additional step of supplying moisture to the material on the higher pressure side of said communication.

18. The hydration process of continuously hydrating an alkali earth oxid, including the step of supplying moisture, the step of trapping the vapor in the chamber in which the moisture is supplied to the material to increase the pressure above atmosphere during said stage of treatment, during such stage treatment the step of supplying material for treatment to said stage by feeding it through to said stage against vapor escape, and the additional step of continuing the progress and agitation of said material from said pressure stage into a subsequent lower pressure stage.

In witness whereof I affix my signature.

JOHN C. SCHAFFER.